(12) United States Patent
Hoshino et al.

(10) Patent No.: US 8,150,405 B2
(45) Date of Patent: *Apr. 3, 2012

(54) TRANSMITTING APPARATUS AND METHOD

(75) Inventors: Masayuki Hoshino, Osaka (JP); Hiroki Haga, Miyagi (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,568

(22) Filed: Jun. 29, 2011

(65) Prior Publication Data

US 2011/0255504 A1 Oct. 20, 2011

Related U.S. Application Data

(63) Continuation of application No. 11/718,375, filed as application No. PCT/JP2005/020021 on Oct. 31, 2005, now Pat. No. 7,996,014.

(30) Foreign Application Priority Data

Nov. 2, 2004 (JP) .................... 2004-319801

(51) Int. Cl.
*H04W 72/00* (2009.01)
*H04W 4/00* (2009.01)

(52) U.S. Cl. .......... 455/450; 455/452.1; 455/452.2; 455/464; 370/329; 370/330

(58) Field of Classification Search .............. 455/450, 455/447, 452.1, 452.2, 455, 464; 370/319, 370/329, 330, 344
See application file for complete search history.

(56) References Cited

U.S. PATENT DOCUMENTS

| 5,726,978 | A  | 3/1998 | Frodigh |
| 6,693,892 | B1 | 2/2004 | Rinne |
| 6,947,748 | B2 | 9/2005 | Li |
| 7,996,014 | B2 * | 8/2011 | Hoshino et al. .......... 455/450 |

FOREIGN PATENT DOCUMENTS

| JP | 11-508417 | 7/1999 |
| JP | 2001-512939 | 8/2001 |
| JP | 2003-018117 | 1/2003 |
| WO | 02/49306 | 6/2002 |

OTHER PUBLICATIONS

Japanese Office Action, dated Jan. 26, 2010.
Zhong-Hai, et al., "Opportunistic Scheduling with Partial Channel Information in OFDMA/FDD Systems," Vehicular Technology Conference, 2004. VTC2004-Fall, 2004 IEEE 60th, IEEE, Sep. 2004, pp. 511-514.
PCT International Search Report dated Dec. 6, 2005 w/ English translation.
Y. Hara, et al.: "Shuhasu Scheduling o Mochiita MC-CDM Hoshiki," IEICE Technical Report RCS 2002-129, vol. 102, No. 206, Jul. 12, 2002, pp. 61-66.

* cited by examiner

*Primary Examiner* — Un C Cho
(74) *Attorney, Agent, or Firm* — Seed IP Law Group PLLC

(57) ABSTRACT

A communication device which can reduce amount of control information, limit interference with other traffics, and prevent an increase in current consumption. In this device, a separation unit (105) separates radio resource allocation information, specific section information and transmission parameter information from a received signal. A specific section information control unit (106) selects a sub-carrier designated by the specific section information to allocate data to be transmitted to the own unit. A channel quality measuring unit (107) uses a pilot signal to measure the channel quality of the selected sub-carrier. A channel quality information creating unit (108) creates channel quality information indicating the measurement results input from the channel quality measuring unit (107). A multiplexing unit (109) multiplexes the transmission signal with the channel quality information.

3 Claims, 15 Drawing Sheets

TRANSMITTING APPARATUS AND METHOD

This is a continuation application of application Ser. No. 11/718,375 filed May 1, 2007, which is a national stage of PCT/JP2005/020021 filed Oct. 31, 2005, which is based on Japanese Application No. 2004-319801 filed. Nov. 2, 2004, the entire contents of each which, are incorporated by reference herein.

TECHNICAL FIELD

The present invention relates to a communication apparatus and a scheduling method, and, more particularly, a communication apparatus, a communication terminal apparatus and a scheduling method that are applied to a communication scheme using frequency scheduling.

BACKGROUND ART

In high-speed wireless transmission, it is important to improve efficiency of signal transmission using flexible transmission control that can accommodate various traffic. Traffic control techniques include time scheduling and frequency scheduling, and, for example, frequency scheduling in MC-CDMA (multi-carrier CDMA) is being studied.

In MC-CDMA, a base station selects subcarriers that have good channels based on channel quality information such as SINR (signal-to-interference plus noise ratio) which is reported from a plurality of communication terminal apparatuses and transmits data. Users use the subcarriers that have good channel states, and therefore communication at a low PER (packet error rate) is possible.

Methods for controlling resources taking into consideration a requirement for delay have also been proposed (for example, Patent Document 1). In such control methods, circuit-switching connections that accompany bandwidths capable of dynamic control are allocated to connections having strict requirements for a transmission delay. After resources are allocated to circuit-switching connections, resources are allocated from the unassigned resource pool to connections that have a high degree of allowance for a transmission delay.

Patent Document 1: Japanese Patent Publication Laid-Open No. 2001-512939

DISCLOSURE OF INVENTION

Problems to be Solved by the Invention

In conventional apparatuses, however, the communication terminal apparatuses must report the channel quality information of all subcarriers to the base station apparatus during frequency scheduling, and therefore there is a problem that the amount of uplink control information increases and interference with other traffic increases. Conventional communication terminal apparatuses must also measure the channel quality for all subcarriers, and therefore there is a problem that current consumption increases due to signal processing for monitoring the channel. When conventional apparatuses are assumed to apply resource control that takes into consideration a requirement for delay, users to which data allowing a delay is transmitted must continue to transmit control information just like users to which data not allowing a delay is transmitted, regardless of the lowered priority level of transmission allocation. Therefore, there is a problem that interference due to the transmission of control information increases and current consumption also increases due to the channel quality measurement.

It is therefore an object of the present invention to provide a communication apparatus and a scheduling method that can reduce the amount of control information, minimize interference with other traffic, and also prevent increases in current consumption.

Means for Solving the Problem

The communication apparatus of the present invention has a configuration including: a subcarrier selection section that selects subcarriers from a plurality of subcarriers within predetermined communication band; a channel quality measurement section that measures channel quality for the subcarriers selected by the subcarrier selection section; and a report section that reports channel quality information to a communicating party, the channel quality information being information of the channel quality for the subcarriers measured by the channel quality measurement section.

The scheduling method of the present invention includes the steps of: selecting subcarriers from a plurality of subcarriers within predetermined communication band; measuring channel quality for the selected subcarriers; reporting channel quality information to a communicating party, the channel quality information being information of the channel quality for the measured subcarriers; and selecting at the communicating party, subcarriers to which a transmission signal is allocated, based on the channel quality information.

Advantageous Effect of the Invention

According to the present invention, it is possible to reduce the amount of control information, minimize interference with other traffic, and prevent increases in current consumption.

BEST MODE FOR CARRYING OUT THE INVENTION

Now, embodiments of the present invention will be described in detail with reference to the accompanying drawings.

Embodiment 1

Figure 1:
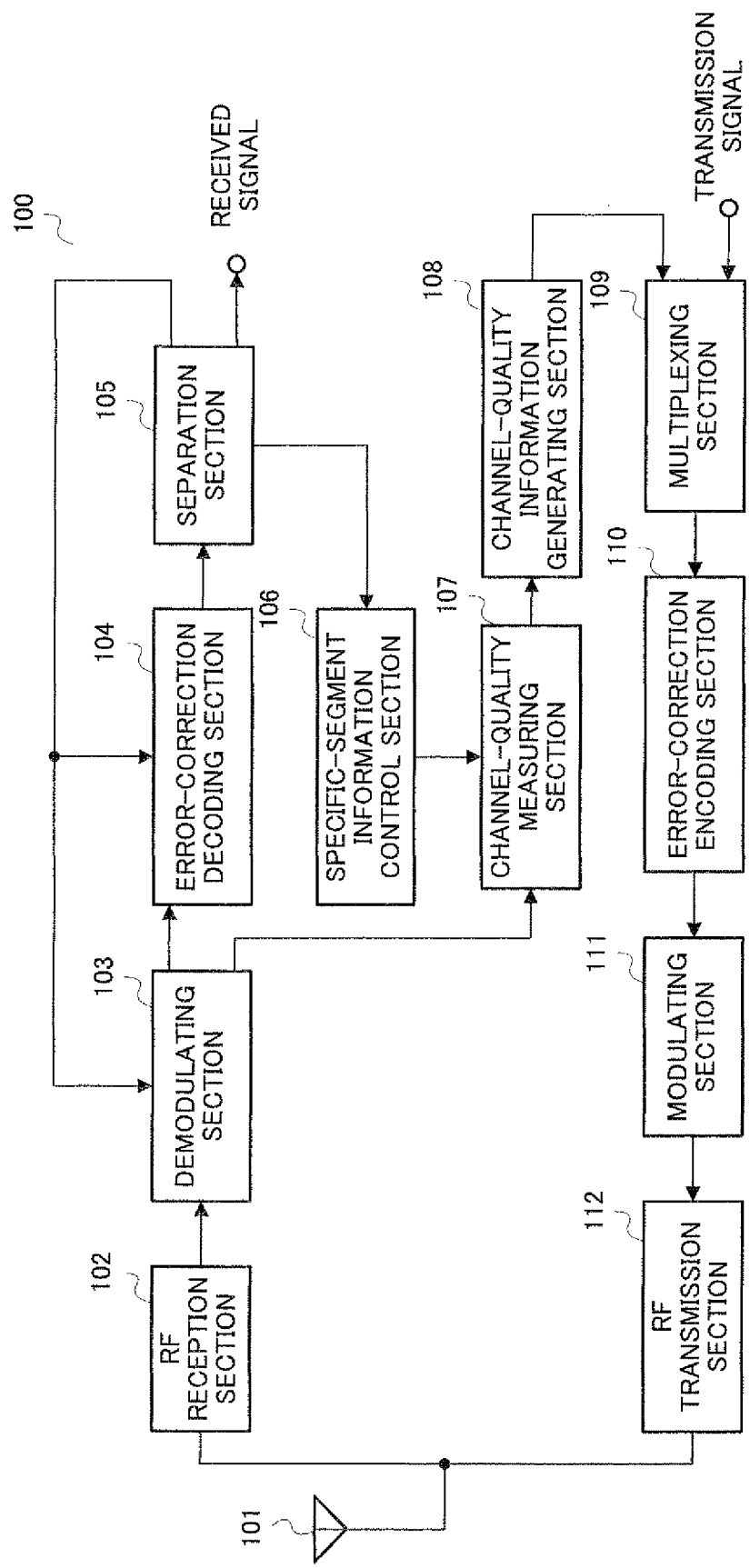
FIG. 1 is a block diagram showing the configuration of a communication apparatus according to Embodiment 1 of the present invention.

FIG. 1 is a block diagram showing the configuration of communication apparatus 100 according to Embodiment 1 of the present invention. In the present Embodiment 1, a case will be described as an example where communication apparatus 100 is applied to a communication terminal apparatus.

Antenna 101 receives and outputs a signal to RF reception section 102 and transmits the signal inputted from RF transmission section 112.

RF reception section 102 down-converts received signal inputted by antenna 101 from a radio frequency to a baseband frequency, and outputs the result to demodulating section 103.

Demodulating section 103 demodulates received signal inputted from RF reception section 102 based on information of the modulation scheme included in the transmission parameter information inputted from separation section 105, which is described later, for the subcarriers indicated by the radio-resource allocation information inputted from separation section 105, and outputs the result to error-correction decoding section 104 and channel quality measuring section 107. Transmission parameter information is information of the modulation scheme and encoding rate allocated to each communication apparatus by the base station apparatus, which is described later, and transmitted from the base station apparatus to each of the communication apparatuses. Radio-resource allocation information is information of the subcarriers selected by the base station apparatus based on channel quality, and transmitted from the base station apparatus to each of the communication apparatuses.

Error-correction decoding section 104 decodes and corrects errors of the received signal inputted from demodulating section 103 based on information of the encoding rate included in the transmission parameter information inputted from separation section 105, for the subcarriers indicated by the radio-resource allocation information inputted from separation section 105, and outputs the result to separation section 105.

Separation section 105 separates radio-resource allocation information, specific segment information and transmission parameter information from the received signal inputted from error-correction decoding section 104. Separation section 105 outputs the separated specific segment information to specific-segment information control section 106 and outputs the radio-resource allocation information and transmission parameter information to demodulating section 103 and error-correction decoding section 104. Separation section 105 also outputs the received signal after separating the radio-resource allocation information, the specific segment information and the transmission parameter information. Specific segment information is information of the subcarriers selected by communication apparatus 100 indicated by the base station apparatus and transmitted from the base station apparatus to each of the communication apparatuses.

Specific-segment information control section 106, which is a subcarrier selection section, selects subcarriers which are indicated by the specific segment information inputted from separation section 105, and to which data transmitted to communication apparatus 100 is allocated, and outputs information of the selected subcarriers to channel quality measuring section 107. The method for selecting subcarriers will be described later.

Channel quality measuring section 107 measures channel quality of the selected subcarriers from information of the subcarriers inputted from specific-segment information control section 106, using a pilot signal which is a known signal included in the received signal inputted from demodulating section 103. Channel quality measuring section 107 then outputs the measurement result to channel quality information generating section 108.

Channel quality information generating section 108 generates channel quality information, which is information indicating the measurement result inputted from channel quality measuring section 107, and outputs the generated channel quality information to multiplexing section 109.

Multiplexing section 109 multiplexes the received signal and the channel quality information inputted from channel quality information generating section 108 and outputs the result to error-correction encoding section 110.

Error-correction encoding section 110 corrects errors and encodes the multiplexed transmission signal inputted from multiplexing section 109 and outputs the result to modulating section 111.

Modulating section 111 modulates the transmission signal inputted from error-correction encoding section 110 and outputs the result to RF transmission section 112.

RF transmission section 112 up-converts the transmission signal inputted by modulating section 111 from a baseband frequency to a radio frequency and outputs the result to antenna 101.

Figure 2:
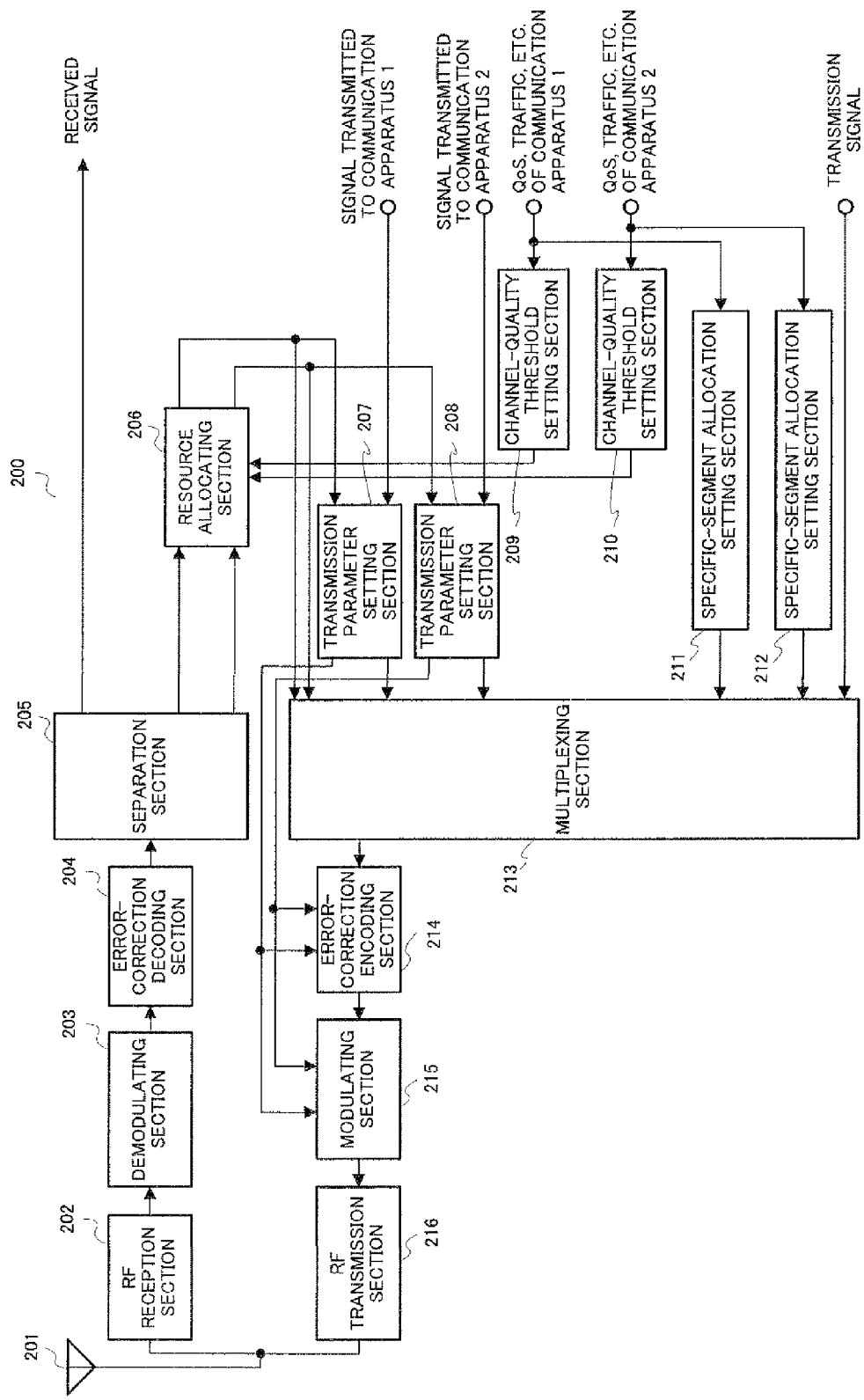
FIG. 2 is a block diagram showing the configuration of a base station apparatus according to Embodiment 1 of the present invention.

The configuration of base station apparatus 200, which is a communicating party of communication apparatus 100, will be described with reference to FIG. 2. FIG. 2 is a block diagram showing the configuration of base station apparatus 200. FIG. 2 shows a case where base station apparatus 200 communicates with two communication apparatuses 100, but base station apparatus 200 can also communicate with an arbitrary number other than two, of communication apparatuses. In this case, transmission parameter setting sections 207 and 208, channel quality threshold setting sections 209 and 210, and specific-segment allocation setting sections 211 and 212 may be provided with the same numbers as the communication apparatuses that are in communication.

Antenna 201 receives and outputs a signal to RF reception section 202 and transmits the signal inputted from RF transmission section 216.

RF reception section 202 down-converts received signal inputted by antenna 201 from a radio frequency to a baseband frequency and outputs the result to demodulating section 203.

Demodulating section 203 demodulates the received signal inputted from RF reception section 202 and outputs the result to error-correction decoding section 204.

Error-correction decoding section 204 decodes and corrects errors in the received signal inputted from demodulating section 203 and outputs the result to separation section 205.

Separation section 205 separates channel quality information for each subcarrier reported from each communication apparatus, from the received signal inputted from error-correction decoding section 204. Separation section 205 outputs the separated channel quality information of each communication apparatus to resource allocating section 206 and outputs the received signal after separating the channel quality information.

Resource allocating section 206 allocates resources—subcarriers—to each communication apparatus based on the channel quality information inputted from separation section 205 and the threshold value information inputted from channel quality threshold setting sections 209 and 210, which are described later. At this time, resource allocating section 206 excludes subcarriers for which channel quality information is not reported from communication apparatuses 100, from allocation targets. For example, resource allocating section 206 allocates subcarriers by selecting subcarriers in which the channel quality of the channel quality information at each communication apparatus 100 is equal to or greater than the threshold value. Resource allocating section 206 then outputs radio-resource allocation information, which is information of the allocated subcarriers, to multiplexing section 213 and also outputs the radio-resource allocation information for each communication apparatus to transmission parameter setting sections 207 and 208.

Transmission parameter setting section 207 sets a transmission parameter such as a modulation scheme and encoding rate in the subcarriers to which the transmission signal is allocated, based on the radio-resource allocation information inputted from resource allocating section 206. Transmission parameter setting section 207 then adds the set transmission parameter information to the transmission signal addressed to each communication apparatus and outputs the result to multiplexing section 213. Transmission parameter setting section 207 also instructs error-correction encoding section 214 and modulating section 215 to process the transmission signal using the set transmission parameter.

Transmission parameter setting section 208 sets a transmission parameter such as a modulation scheme and encoding rate in the subcarriers to which the transmission signal is allocated, based on the radio-resource allocation information inputted from resource allocating section 206. Transmission parameter setting section 208 then adds the set transmission parameter information to the transmission signal addressed to each communication apparatus and outputs the result to multiplexing section 213. Transmission parameter setting section 208 also instructs error-correction encoding section 214 and modulating section 215 to process the transmission signal using the set transmission parameter.

Channel quality threshold setting section 209 sets a threshold value based on the QoS (quality of service) and traffic of the communication apparatus and outputs the set threshold value information to resource allocating section 206.

Channel quality threshold setting section 210 sets a threshold value based on the QoS and traffic of the communication apparatus and outputs the set threshold value information to resource allocating section 206.

Specific-section allocation setting section 211 selects arbitrary subcarriers from a plurality of subcarriers within predetermined communication band based on the value such as QoS and traffic of the communication apparatus. Specific-segment allocation setting section 211 then outputs specific segment information, which is information of the selected subcarriers, to multiplexing section 213.

Specific-segment allocation setting section 212 selects arbitrary subcarriers from a plurality of subcarriers within predetermined communication band based on the value such as QoS and traffic of the communication apparatus. Specific-segment allocation setting section 212 then outputs specific segment information, which is information of the selected subcarriers, to multiplexing section 213.

Multiplexing section 213 multiplexes the transmission parameter information inputted from transmission parameter setting sections 207 and 208, the specific segment information inputted from specific-segment allocation setting sections 211 and 212, the radio-resource allocation information inputted from resource allocating section 206, and the transmission signal, and outputs the result to error-correction encoding section 214.

Error-correction encoding section 214 corrects errors and encodes the multiplexed transmission signal inputted from multiplexing section 213 at the encoding rate indicated by transmission parameter setting sections 207 and 208 and outputs the result to modulating section 215.

Modulating section 215 modulates the transmission signal inputted from error-correction encoding section 214 at the modulation scheme indicated by transmission parameter setting sections 207 and 208 and outputs the result to RF transmission section 216.

RF transmission section 216 up-converts the transmission signal inputted by modulating section 215 from a baseband frequency to a radio frequency and outputs the result to antenna 201.

Figure 3:
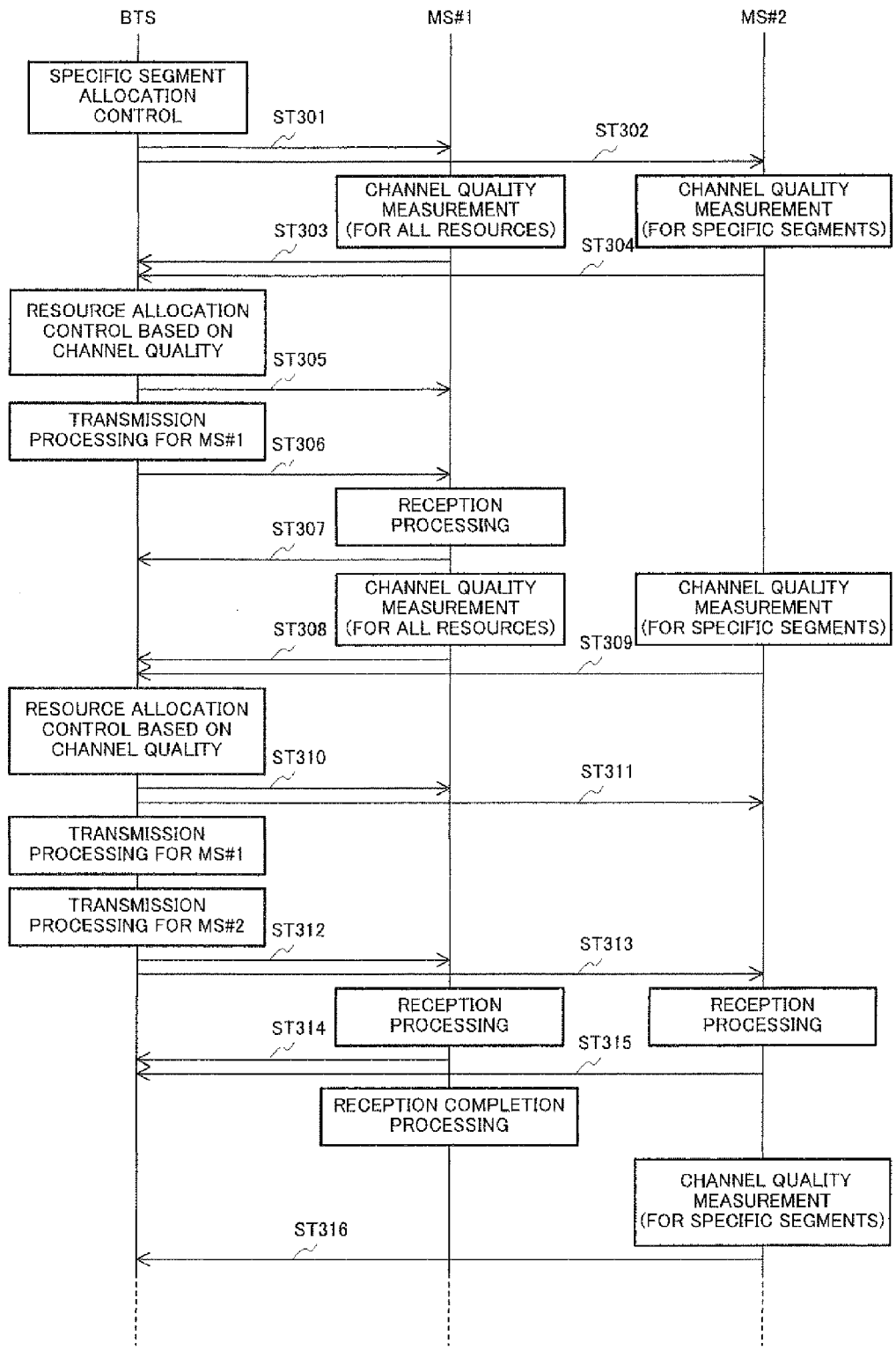
FIG. 3 is a sequence diagram showing the operation of the communication apparatus and the base station apparatus according to Embodiment 1 of the present invention.

The operation of communication apparatus 100 and base station apparatus 200 will be described next using FIG. 3. FIG. 3 is a sequence diagram showing the operation of communication apparatus 100 and base station apparatus 200, and the case will be described as an example where base station apparatus 200 communicates with two communication apparatuses 100. In FIG. 3, for the convenience of explanation, two communication apparatuses 100 are indicated as MS#1 and MS#2, respectively, and base station apparatus 200 is indicated as BTS. MS#1 and MS#2 have the same configuration as FIG. 1, and BTS has the same configuration as FIG. 2.

BTS sets in advance a specific segment that accommodates users which allow a delay at specific-segment allocation setting sections 211 and 212 (controls specific segment allocation). When BTS transmits, for example, data that cannot allow a delay to MS#1 and transmits data that can allow a delay to MS#2, specific-segment allocation setting section 211 selects the specific segment that includes all subcarriers within the communication band, and BTS transmits to MS#1 the specific segment information of the specific segment selected by specific-segment allocation setting section 211 (step ST301). Specific-segment allocation setting section 212 also selects a part of the subcarriers from the plurality of subcarriers within the communication band, and BTS transmits to MS#2 the specific segment information of the specific segment selected by specific-segment allocation setting section 212 (step ST302).

Figure 4:
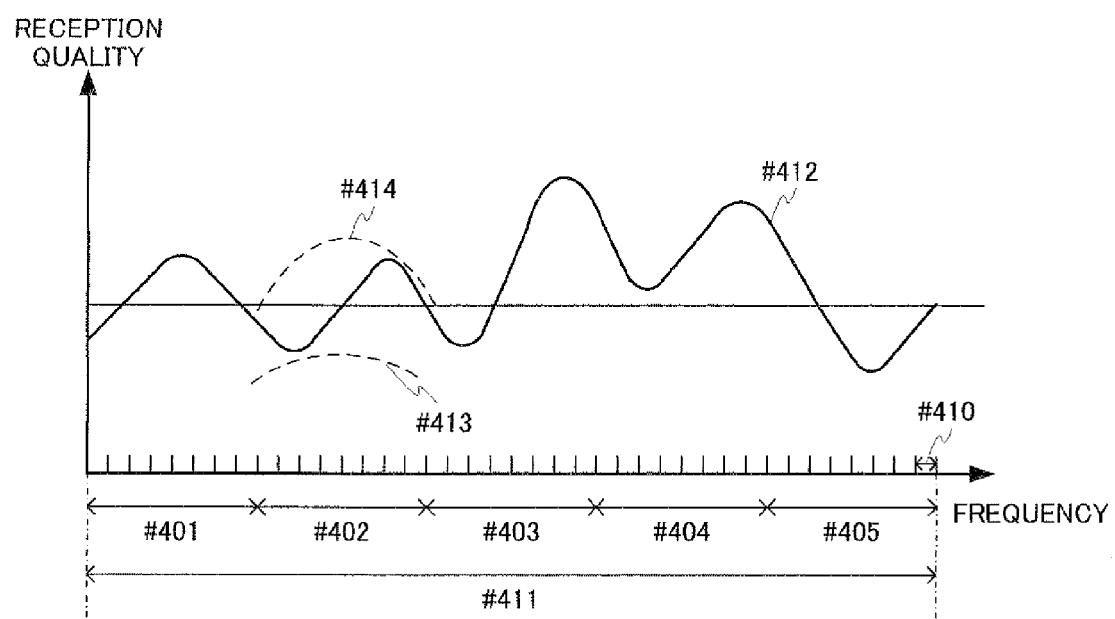
FIG. 4 shows the relationship between frequency and channel quality according to Embodiment 1 of the present invention.

Next, MS#1, which receives the specific segment information, selects the subcarriers indicated by the specific segment information at specific-segment information control section 106, and measures the channel quality for the selected subcarriers at channel quality measuring section 107 (measures channel quality (of all resources)). FIG. 4 shows the relationship between frequency and channel quality within communication band #411 of MS#1 and MS#2. Forty subcarriers #410 are present within communication band #411 in FIG. 4, and five groups of specific segments #401, #402, #403, #404 and #405 are set within communication band #411. According to FIG. 4, MS#1 receives specific segment information that selects all specific segments #401, #402, #403, #404 and #405, and therefore channel quality measuring section 107 measures the channel quality for subcarriers #410 of all specific segments #401, #402, #403, #404 and #405. MS#1 then reports measured channel quality #412 for subcarriers #410 of specific segments #401, #402, #403, #404 and #405 to BTS (step ST303).

Meanwhile, MS#2, which receives the specific segment information, selects the subcarriers indicated by the specific segment information at specific-segment information control section 106, and measures the channel quality for the selected subcarriers at channel quality measuring section 107 (measures channel quality (for specific segments)). According to FIG. 4, MS#2 receives specific segment information that selects, for example, specific segment #402, and channel quality measuring section 107 measures the channel quality for subcarriers #410 of specific segment #402. MS#2 then reports measured channel quality #413 for subcarriers #410 of specific segment #402 to BTS (step ST304).

BTS receives the channel quality information of channel quality #412 and #413 and allocates resources to MS#1 at resource allocating section 206 in accordance with channel quality #412 for subcarriers of specific segments #401, #402, #403, #404 and #405 (controls resource allocation based on the channel quality). At this time, channel quality #412 is of higher quality than channel quality #413, and BTS performs allocation processing in accordance with the requirement for delay, and therefore resources can be allocated to MS#1 to which data that does not allow a delay is transmitted, but resources cannot be allocated to MS#2. BTS therefore transmits transmission parameter information only to MS#1 (step ST305). BTS then processes the transmission signal to be transmitted to MS#1 based on the transmission parameter set by transmission parameter setting section 207 (transmission processing for MS#1). BTS then transmits the transmission signal to MS#1 (step ST306). MS#1 receives the transmission parameter information and the transmission signal, processes the received signal (reception processing), confirms that demodulation is successful, and returns a reception response to BTS (step ST307).

MS#1 then measures channel quality #412 for subcarriers of specific segments #401, #402, #403, #404 and #405 of the specific segment information received in step ST301 at channel quality measuring section 107 (measures channel quality (for all resources)) and reports the channel quality information to BTS (step ST308). MS#2 also measures channel quality #414 for the subcarriers of specific segment #402 of the specific segment information received in step ST302 at channel quality measuring section 107 (measures channel quality (for specific segments)) and reports the channel quality information to BTS (step ST309).

The channel quality for specific segment #402 is of higher channel quality for MS#2 than for MS#1, and therefore BTS which receives the channel quality information of channel quality #412 and #414 next allocates resources to MS#1 at resource allocating section 206 in accordance with channel quality #412 for the subcarriers of specific segments #401, #403, #404 and #405 and allocates resources to MS#2 in accordance with channel quality #414 for the subcarriers of specific segment #402 (controls resource allocation based on the channel quality). BTS therefore transmits transmission parameter information of the subcarriers of specific segments #401, #403, #404 and #405 to MS#1 (step ST310) and transmits transmission parameter information of the subcarriers of specific segment #402 to MS#2 (step ST311).

BTS then processes the transmission signal to be transmitted to MS#1 based on the transmission parameter set by transmission parameter setting section 207 (transmission processing for MS#1) and processes the transmission signal to be transmitted to MS#2 based on the transmission parameter set by transmission parameter setting section 208 (transmission processing for MS#2). BTS then transmits the transmission signal to MS#1 (step ST312) and the transmission signal to MS#2 (step ST313). MS#1 then receives the transmission parameter information and the transmission signal, processes the received signal (reception processing), and returns a reception response to BTS (step ST314). MS#2 also receives the transmission parameter information and the transmission signal, processes the received signal (reception processing), confirms that demodulation is successful, and returns a reception response to BTS (step ST315).

MS#1 performs predetermined processing assuming that communication is complete at the second transmission addressed to MS#1 (reception completion processing), and after that, does not measure quality. MS#2 measures channel quality #414 for the subcarriers of specific segment #402 of the specific segment information received in step ST302 at channel quality measuring section 107 (measures channel quality (for specific segments)) and reports the channel quality information to BTS (step ST316)). Similar processing is repeated thereafter.

According to the present Embodiment 1, the communication terminal apparatus only measures and reports to the base station apparatus the channel quality for the subcarriers indicated by the base station apparatus, so that it is possible to reduce the amount of control information, minimize interference with other traffic, and prevent increases in current consumption.

Embodiment 2

Figure 5:
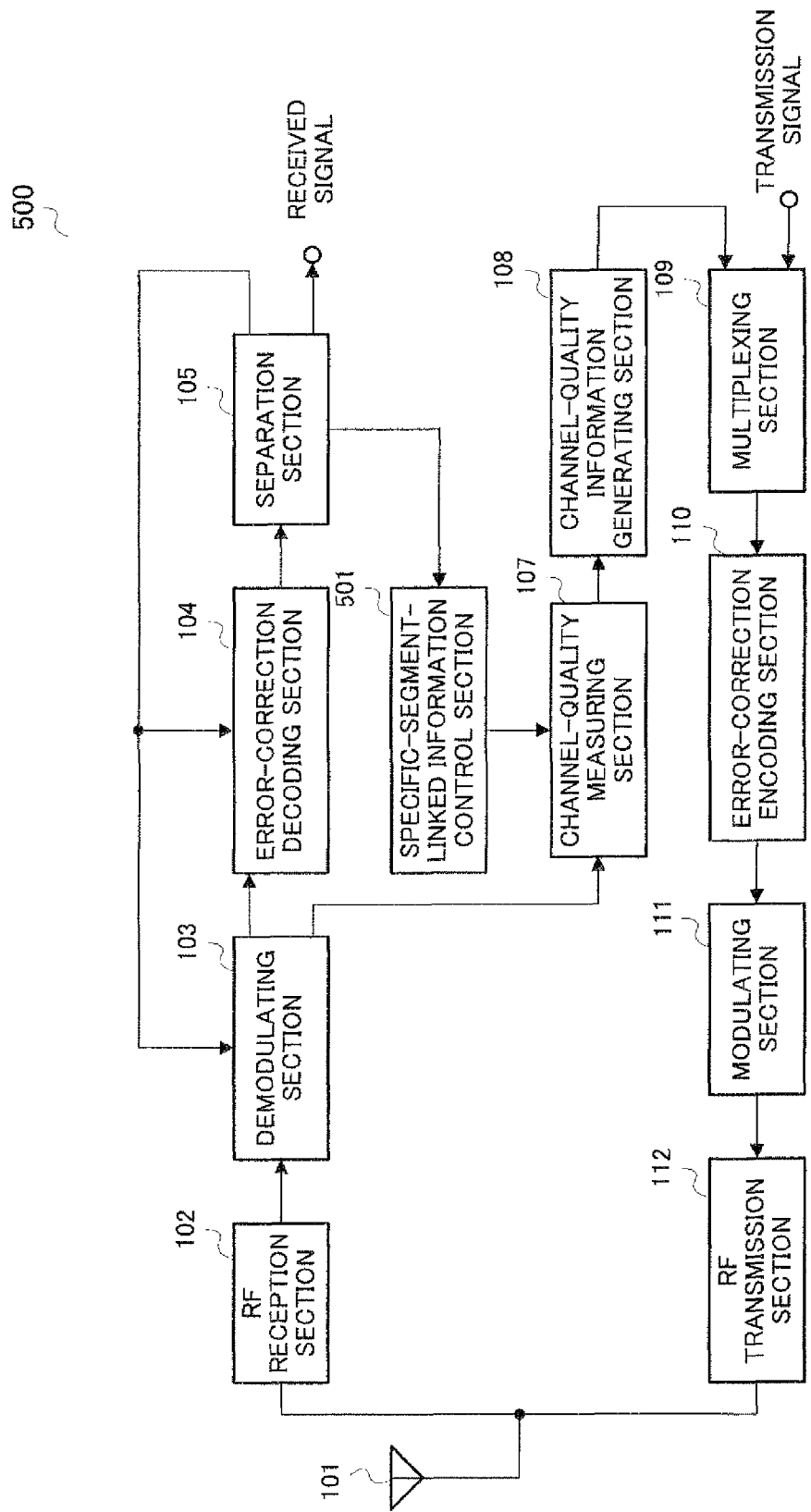
FIG. 5 is a block diagram showing the configuration of a communication apparatus according to Embodiment 2 of the present invention.

FIG. 5 is a block diagram showing the configuration of communication apparatus 500 according to Embodiment 2 of the present invention. In the present Embodiment 2, the case will be described as an example where communication apparatus 500 is applied to a communication terminal apparatus.

In communication apparatus 500 according to the present Embodiment 2, specific-segment information control section 106 is removed from communication apparatus 100 according to Embodiment 1 shown in FIG. 1, and specific-segment-related information control section 501 is added as shown in FIG. 5. In FIG. 5, components that are the same as those in FIG. 1 will be assigned the same reference numerals without further explanations.

Separation section 105 separates radio-resource allocation information, specific segment information, specific segment validity period information, and transmission parameter information from the received signal inputted from error-correction decoding section 104, outputs the separated specific segment information and specific segment validity period information to specific-segment-related information control section 501 and outputs the radio-resource allocation information and transmission parameter information to demodulating section 103 and error-correction decoding section 104. Separation section 105 also outputs the received signal after separating the radio-resource allocation information, the specific segment information, the specific segment validity period information and the transmission parameter information. Specific segment validity period information in this case is information for specifying a predetermined period for selecting subcarriers indicated by the base station apparatus and transmitted from the base station apparatus to each of the communication apparatuses.

Specific-segment-related information control section 501 selects subcarriers to which data transmitted to communication apparatus 500 is allocated, based on the specific segment information inputted from separation section 105 and within the specific segment validity period (specific segment selection period) indicated by the specific segment validity period information inputted from separation section 105. Specifically, specific-segment-related information control section 501 selects the subcarriers indicated by the specific segment information within the period indicated by the specific segment validity period information, and selects all subcarriers within predetermined communication band within a period not indicated by the specific segment validity period information. Specific-segment-related information control section 501 then outputs information of the selected subcarriers to channel quality measuring section 107. The method for selecting subcarriers will be described later. When the subcarriers selected by the specific segment information are indicated for all periods, the base station apparatus need not transmit specific segment validity period information.

Channel quality measuring section 107 measures channel quality for the selected subcarriers from information of the subcarriers inputted from specific-segment-related information control section 501 using a pilot signal which is a known signal included in the received signal inputted from demodulating section 103. Channel quality measuring section 107 then outputs the measurement result to channel quality information generating section 108.

Figure 6:
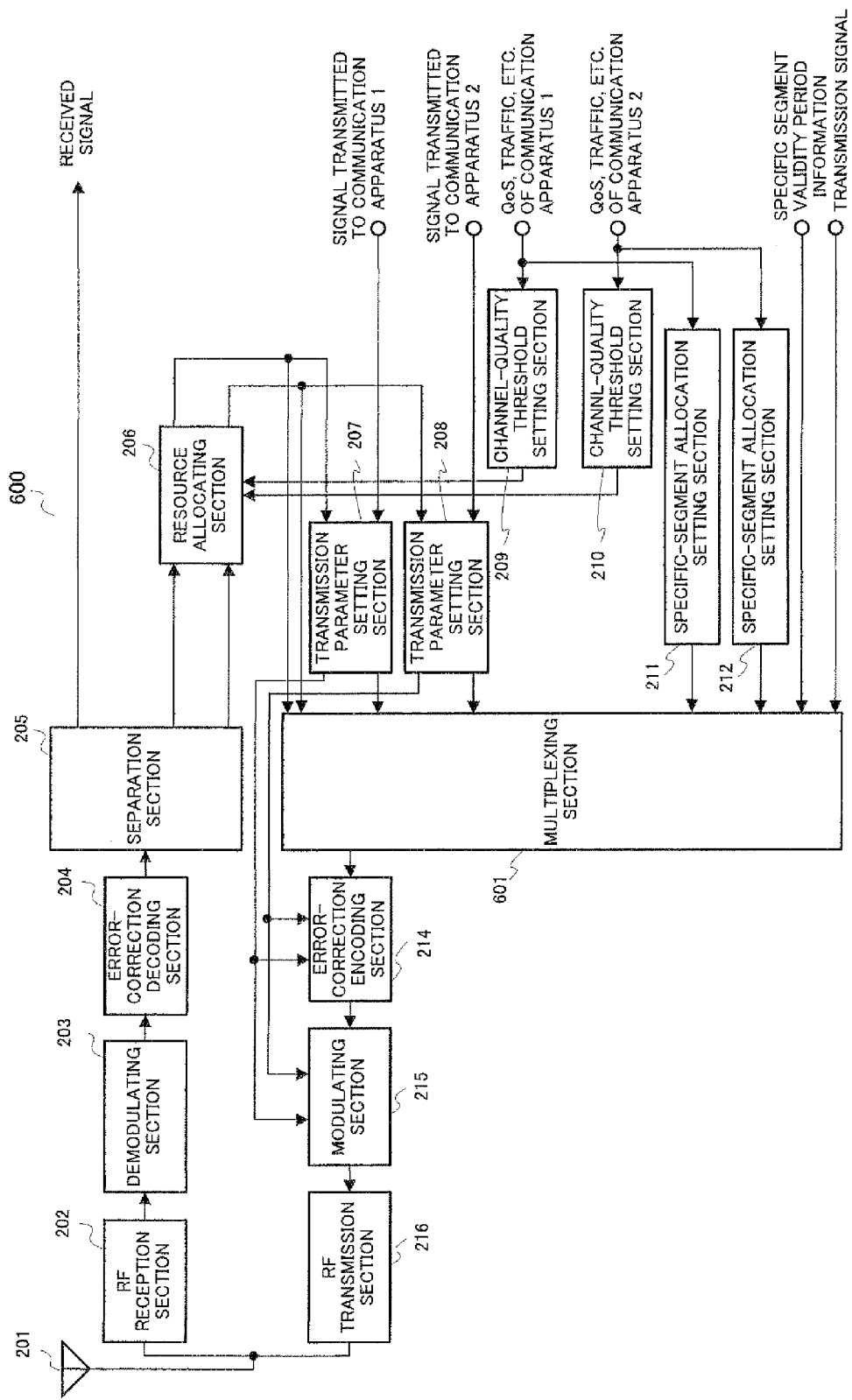
FIG. 6 is a block diagram showing the configuration of a base station apparatus according to Embodiment 2 of the present invention.

The configuration of base station apparatus 600 will be described next using FIG. 6. FIG. 6 is a block diagram showing the configuration of base station apparatus 600.

As shown in FIG. 6, base station apparatus 600 according the present Embodiment 2 has multiplexing section 601 instead of multiplexing section 213 of base station apparatus 200 according to Embodiment 1 shown in FIG. 2. In FIG. 6, components that are the same as those in FIG. 2 will be assigned the same reference numerals without further explanations.

Transmission parameter setting section 207 sets a transmission parameter such as a modulation scheme and encoding rate in the subcarriers to which transmission signal is allocated, based on the radio-resource allocation information inputted from resource allocating section 206. Transmission parameter setting section 207 then adds the set transmission parameter information to the transmission signal addressed to each communication apparatus, outputs the result to multiplexing section 601, and instructs error-correction encoding section 214 and modulating section 215 to process the transmission signal using the set transmission parameter.

Transmission parameter setting section 208 sets a transmission parameter such as a modulation scheme and encoding rate in the subcarriers to which transmission signal is allocated, based on the radio-resource allocation information inputted from resource allocating section 206. Transmission parameter setting section 208 then adds the set transmission parameter information to the transmission signal addressed to each communication apparatus, outputs the result to multiplexing section 601, and instructs error-correction encoding section 214 and modulating section 215 to process the transmission signal using the set transmission parameter.

Specific-segment allocation setting section 211 selects arbitrary subcarriers from a plurality of subcarriers within predetermined communication band based on the value such as QoS and traffic of the communication apparatus. Specific-segment allocation setting section 211 then outputs specific segment information, which is information of the selected subcarriers, to multiplexing section 601.

Specific-segment allocation setting section 212 selects arbitrary subcarriers from a plurality of subcarriers within predetermined communication band based on the value such as QoS and traffic of the communication apparatus. Specific-segment allocation setting section 212 then outputs specific segment information, which is information of the selected subcarriers, to multiplexing section 601.

Multiplexing section 601 multiplexes the transmission parameter information inputted from transmission parameter setting sections 207 and 208, the specific segment information inputted from specific-segment allocation setting sections 211 and 212, the radio-resource allocation information inputted from resource allocating section 206, the specific segment validity period information, and the transmission signal, and outputs the result to error-correction encoding section 214.

Error-correction encoding section 214 corrects errors and encodes the multiplexed transmission signal inputted from multiplexing section 601 at the encoding rate indicated by transmission parameter setting section 208 and outputs the result to modulating section 215.

Figure 7:
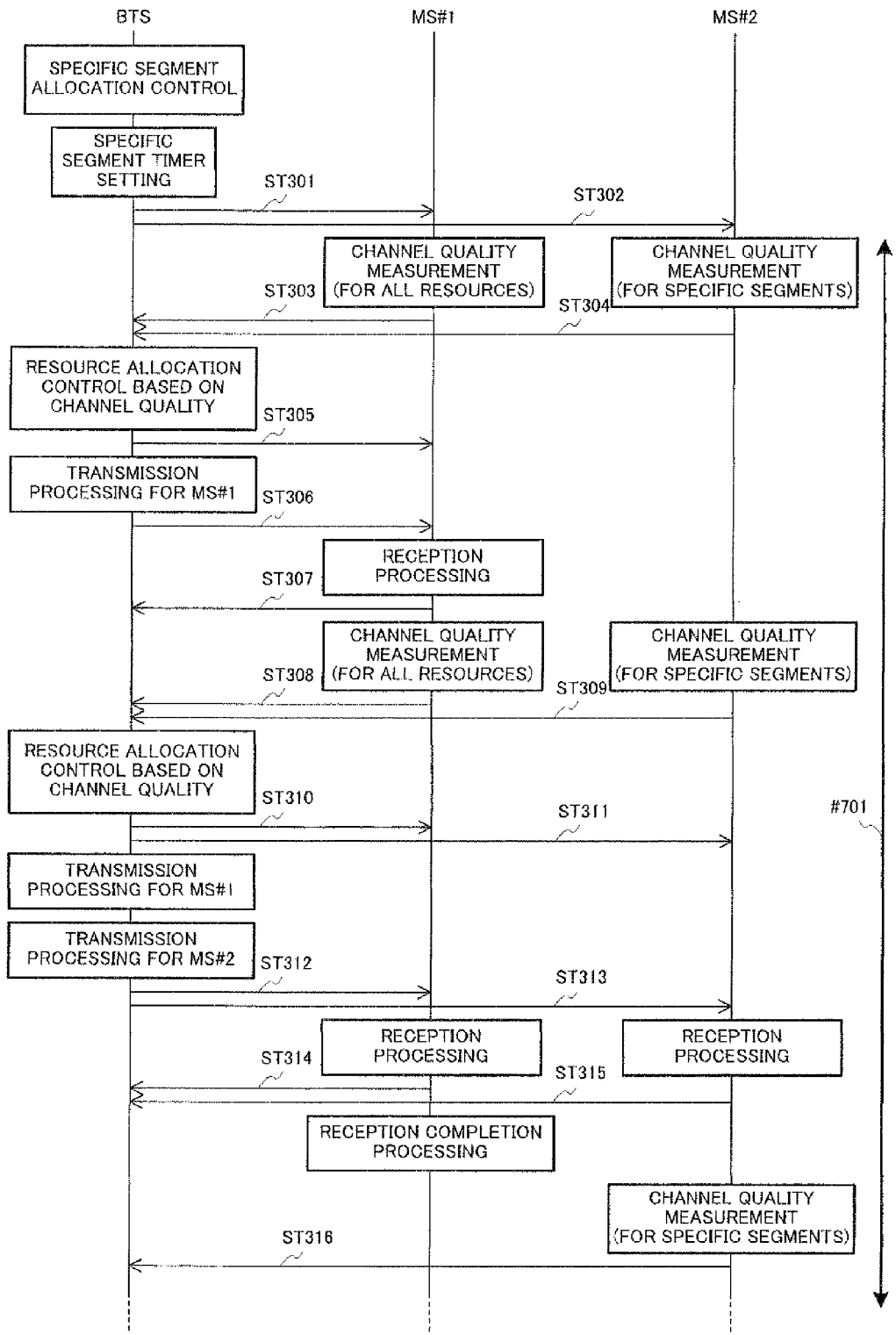
FIG. 7 is a sequence diagram showing the operation of the communication apparatus and the base station apparatus according to Embodiment 2 of the present invention.

The operation of communication apparatus 500 and base station apparatus 600 will be described next using FIG. 7. FIG. 7 is a sequence diagram showing the operation of communication apparatus 500 and base station apparatus 600, and the case will be described as an example where base station apparatus 600 communicates with two communication apparatuses 500. In FIG. 7, for the convenience of explanation, two communication apparatuses 500 are indicated as MS#1 and MS#2, respectively, and base station apparatus 600 is indicated as BTS. MS#1 and MS#2 have the same configuration as FIG. 5, and BTS has the same configuration as FIG. 6.

BTS sets in advance a specific segment that accommodates users that will allow a delay (controls specific segment allocation) at specific-segment allocation setting sections 211 and 212 and sets specific segment validity period #701, which is the processing period for setting the specific segment (sets specific segment timer). BTS thereby performs processing for selecting a specific segment within specific segment validity period #701 and does not perform processing for selecting a specific segment in a period other than specific segment validity period #701. BTS does not change the specific segment information reported to MS#1 and MS#2 during specific segment validity period #701. The subcarriers of the specific segment information can be made to change each time the specific segment validity period is set, or the subcarriers of the specific segment information can be made to be left unchanged in a period during which the specific segment validity period is set a predetermined number of times. In FIG. 7, the case has been described where the specific segment validity period is set once, but the specific segment validity period may be set a plurality of times within a predetermined period. The subsequent operation is the same as in FIG. 3, and therefore a description of that operation will be omitted.

According to the present Embodiment 2, the base station apparatus sets a specific segment validity period within a predetermined period, and therefore, in addition to the effects of the above-described Embodiment 1, it is possible to appropriately control resource distribution for the specific segment allocation for each specific segment validity period. According to the present Embodiment 2, the measuring segment need not be changed in the communication apparatuses during the specific segment validity period indicated by the base station apparatus, and therefore processing in the communication apparatuses can be simplified.

Embodiment 3

Figure 8:
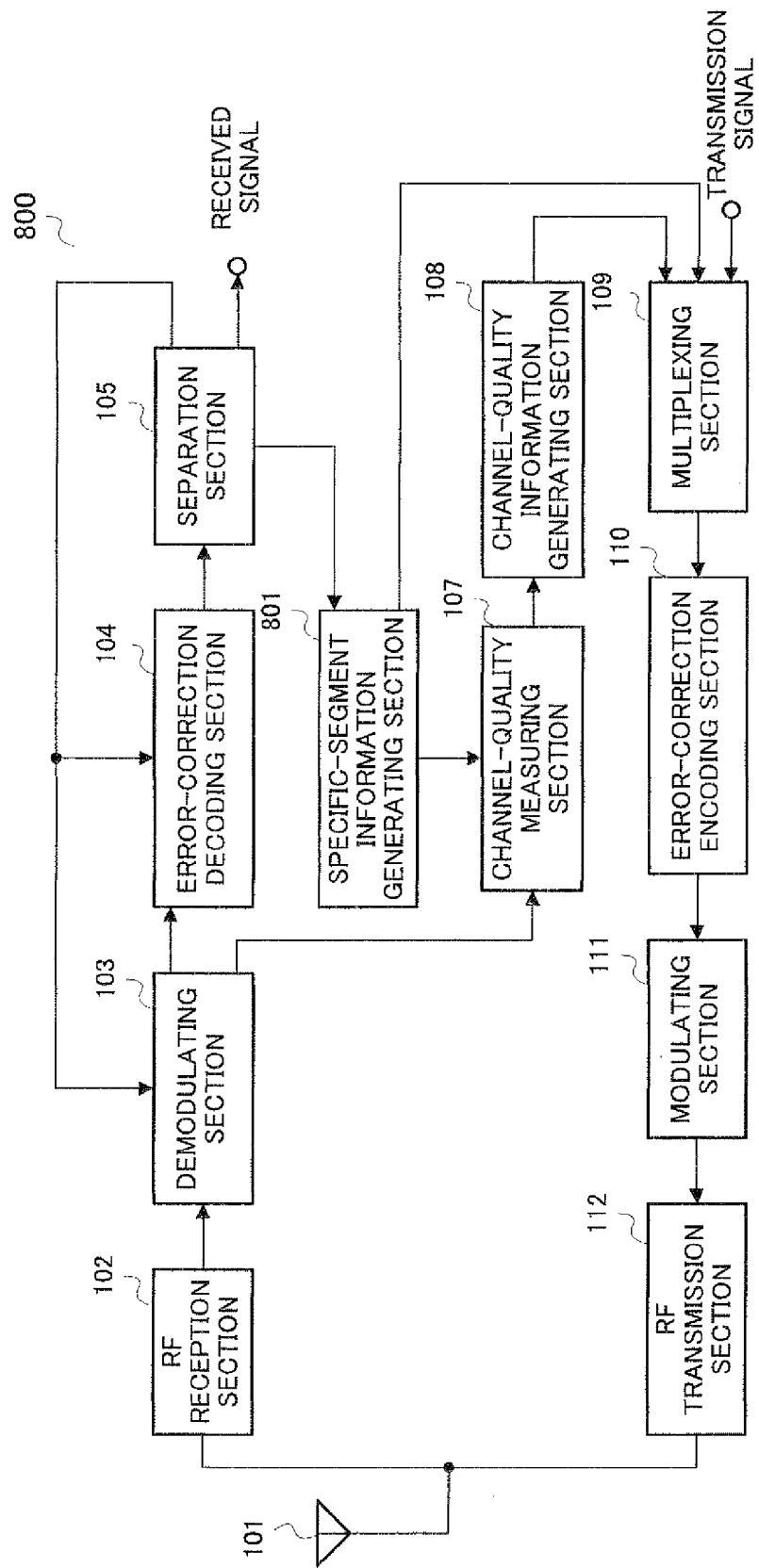
FIG. 8 is a block diagram showing the configuration of a communication apparatus according to Embodiment 3 of the present invention.

FIG. 8 is a block diagram showing the configuration of communication apparatus 800 according to Embodiment 3 of the present invention. In the present Embodiment 3, the case will be described as an example where communication apparatus 800 is applied to a communication terminal apparatus.

In communication apparatus 800 according to the present Embodiment 3, specific-segment information control section 106 is removed from communication apparatus 100 according to Embodiment 1 shown in FIG. 1, and specific-segment information generating section 801 is added as shown in FIG. 8. In FIG. 8, components that are the same as those in FIG. 1 will be assigned the same reference numerals.

Separation section 105 separates radio-resource allocation information and transmission parameter information from the received signal inputted from error-correction decoding section 104 and outputs the separated radio-resource allocation information and transmission parameter information to demodulating section 103 and error-correction decoding section 104. Separation section 105 also separates QoS information, which is information as to whether or not data transmitted to communication apparatus 800 can allow a delay, from the received signal inputted from error-correction decoding section 104 and outputs the separated QoS information to specific-segment information generating section 801. Separation section 105 also outputs the received signal after separating the QoS information, the radio-resource allocation information and the transmission parameter information.

When the data transmitted to communication apparatus 800 can allow a delay according to the QoS information inputted from separation section 105, specific-segment information generating section 801 selects from the subcarriers within predetermined communication band subcarriers to which the data transmitted to communication apparatus 800 is allocated and outputs information of the selected subcarriers to channel quality measuring section 107. When the data transmitted to communication apparatus 800 cannot allow a delay according to the QoS information inputted from separation section 105, specific-segment information generating section 801 selects all subcarriers within the communication band as subcarriers to which the data transmitted to the communication apparatus is allocated and outputs information of the selected subcarriers to channel quality measuring section 107. When the QoS information indicates that the data transmitted to communication apparatus 800 can allow a delay, specific-segment information generating section 801 also outputs information of the selected subcarriers to multiplexing section 109 as specific segment information.

Channel quality measuring section 107 measures channel quality for the selected subcarriers according to information of the subcarriers inputted from specific-segment information generating section 801, using a pilot signal, which is a known signal included in the received signal inputted from demodulating section 103. Channel quality measuring section 107 then outputs the measurement result to channel quality information generating section 108.

Multiplexing section 109 multiplexes the received signal, the channel quality information inputted from channel quality information generating section 108, and the specific segment information inputted from specific-segment information generating section 801, and outputs the result to error-correction encoding section 110.

Figure 9:
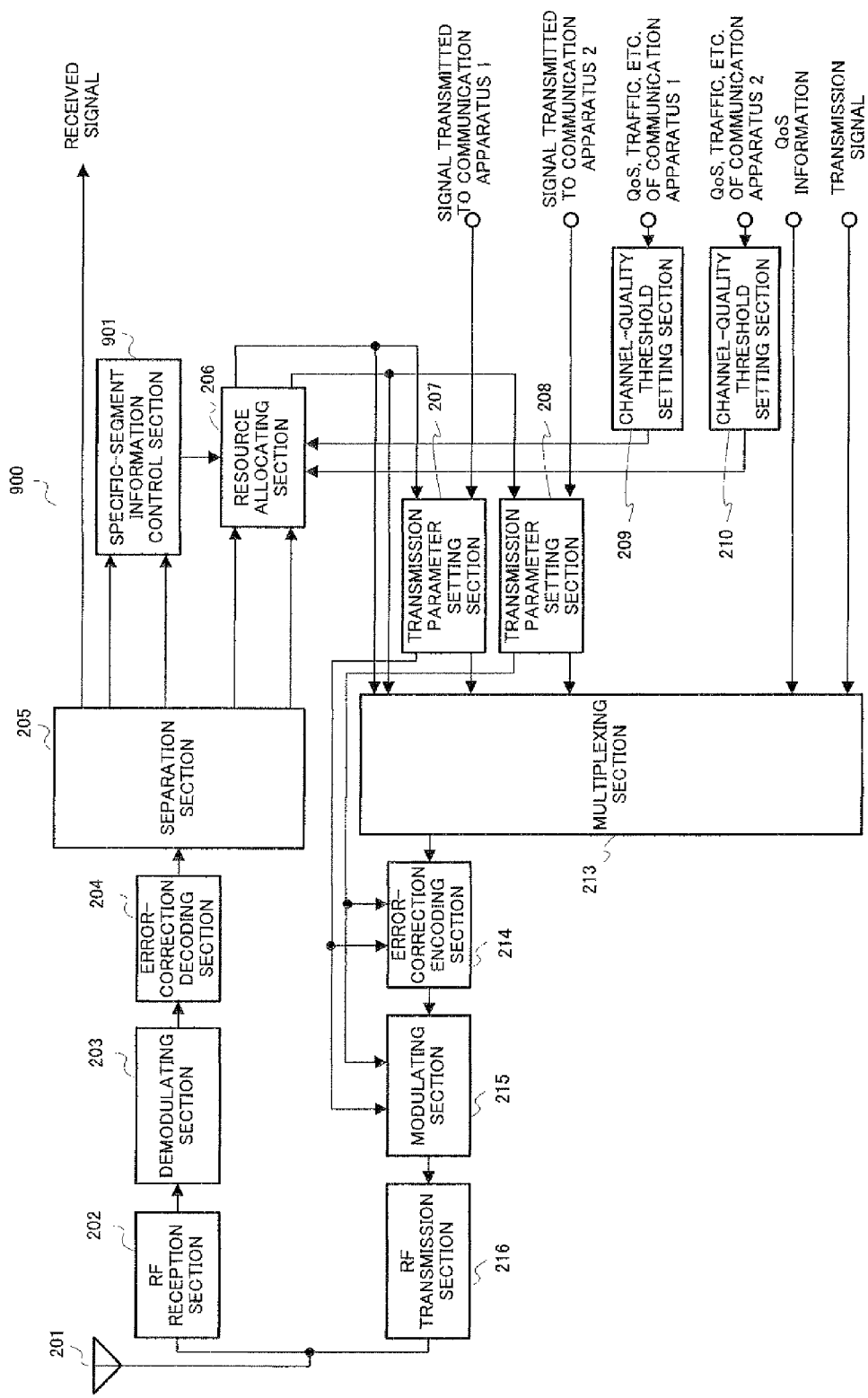
FIG. 9 is a block diagram showing the configuration of a base station apparatus according to Embodiment 3 of the present invention.

The configuration of base station apparatus 900 will be described next using FIG. 9. FIG. 9 is a block diagram showing the configuration of base station apparatus 900. In base station apparatus 900 according to the present Embodiment 2, specific-segment allocation setting section 211 and specific-segment allocation setting section 212 are removed from base station apparatus 200 of Embodiment 1 shown in FIG. 2, and specific-segment information control section 901 is added as shown in FIG. 9. In FIG. 9, components that are the same as those in FIG. 2 will be assigned the same reference numerals without further explanations.

Separation section 205 separates channel quality information and specific segment information for each subcarrier reported from each communication apparatus, from the received signal inputted from error-correction decoding section 204. Separation section 205 outputs the separated channel quality information of each communication apparatus to resource allocating section 206 and outputs the separated specific segment information of each communication apparatus to specific-segment information control section 901. Separation section 205 also outputs the received signal after separating the channel quality information and the specific segment information.

Specific-segment information control section 901 instructs resource is allocating section 206 to perform resource allocation within the range of subcarriers that are selected by communication apparatus 800 and reported in the specific segment information inputted from separation section 205.

Resource allocating section 206 allocates resources—subcarriers—to the communication apparatuses based on the channel quality information inputted from separation section 205 and the threshold value information inputted from channel quality threshold setting sections 209 and 210, for the subcarriers indicated by specific-segment information control section 901. Resource allocating section 206 then outputs radio-resource allocation information, which is information of the allocated subcarriers, to multiplexing section 213 and also outputs radio-resource allocation information for each communication apparatus to transmission parameter setting sections 207 and 208.

Multiplexing section 213 multiplexes the transmission parameter information inputted from transmission parameter setting sections 207 and 208, the radio-resource allocation information inputted from resource allocating section 206, the QoS information, and the transmission signal, and outputs the result to error-correction encoding section 214. Judgment as to whether or not the data in the QoS information can allow a delay is made by comparing the predetermined threshold value and the delay time that the data can allow. For example, if the allowable delay time is equal to or greater than the threshold value, judgment is made that the data can allow a delay.

Figure 10:
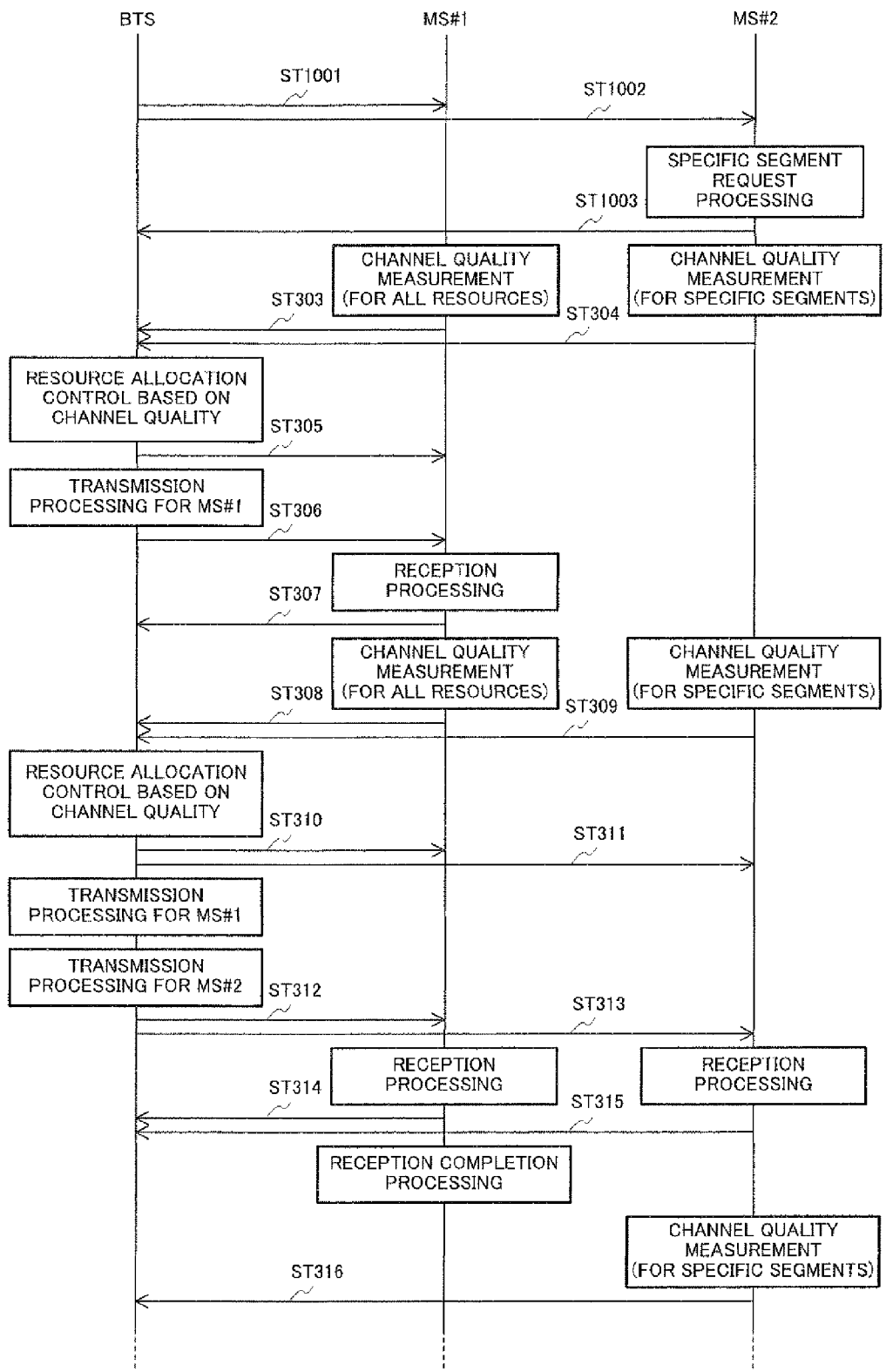
FIG. 10 is a sequence diagram showing the operation of the communication apparatus and the base station apparatus according to Embodiment 3 of the present invention.

The operation of communication apparatus 800 and base station apparatus 900 will be described next using FIG. 10. FIG. 10 is a sequence diagram showing the operation of communication apparatus 800 and base station apparatus 900, and the case will be described as an example where base station apparatus 900 communicates with two communication apparatuses 800. In FIG. 10, for the convenience of explanation, two communication apparatuses 800 are indicated as MS#1 and MS#2, respectively, and base station apparatus 900 is indicated as BTS. MS#1 and MS#2 have the same configuration as FIG. 8, and BTS has the same configuration as FIG. 9.

BTS transmits the QoS information of MS#1 to MS#1 (step ST1001). BTS also transmits the QoS information of MS#2 to MS#2 (step ST1002). In this case, the QoS information transmitted to MS#1 indicates that data that cannot allow a delay will be transmitted, and the QoS information transmitted to MS#2 indicates that data that can allow a delay will be transmitted. The data addressed to MS#1 cannot allow a delay, and therefore MS#1 which receives the QoS information does not generate specific segment information at specific-segment information generating section 801. Meanwhile, the data transmitted to MS#2 can allow a delay, and therefore MS#2 which receives the QoS information generates specific segment information at specific-segment information generating section 801. MS#2 then transmits the generated specific segment information to BTS (step ST1003).

MS#1 which does not transmit specific segment information measures the channel quality for all subcarriers within the communication band (measures channel quality (for all resources)). For example, according to FIG. 4, MS#1 measures the channel quality for subcarriers #410 of all specific segments #401, #402, #403, #404 and #405 at channel quality measuring section 107. MS#1 then reports channel quality #412 for subcarriers #410 of measured specific segments #401, #402, #403, #404 and #405 to BTS (step ST303).

Meanwhile, MS#2 which transmits specific segment information measures the channel quality for the subcarriers of the specific segments of the specific segment information transmitted to BTS (measures channel quality (for specific segments)). For example, according to FIG. 4, when MS#2 transmits the specific segment information of specific segment #402 to BTS, channel quality measuring section 107 measures the channel quality for subcarriers #410 of specific segment #402. MS#2 then reports channel quality #413 for subcarriers #410 of measured specific segment #402 to BTS (step ST304). The subsequent operation of FIG. 10 is the same as in FIG. 3, and therefore the same reference numerals as in FIG. 3 will be assigned without further explanations.

According to the present Embodiment 3, when data that allows a delay is transmitted to the communication apparatus, the communication apparatus selects a part of the subcarriers within the communication band and measures only channel quality for the selected subcarriers and reports the channel quality to the base station apparatus, so that it is possible to reduce the amount of control information, minimize interference with other traffic, and prevent increases in current consumption.

In the present Embodiment 3, Qos information transmitted from base station apparatus 900 includes information of a judgment result as to whether data can allow a delay, but this is by no means limiting, and Qos information may include information of an allowable time, and specific-segment information generating section 801 of communication apparatus 800 may compare between the allowable time of the Qos information and a threshold value, and, when the allowable time is equal to or greater than the threshold value, judgment is made that the data can allow a delay.

Embodiment 4

Figure 11:
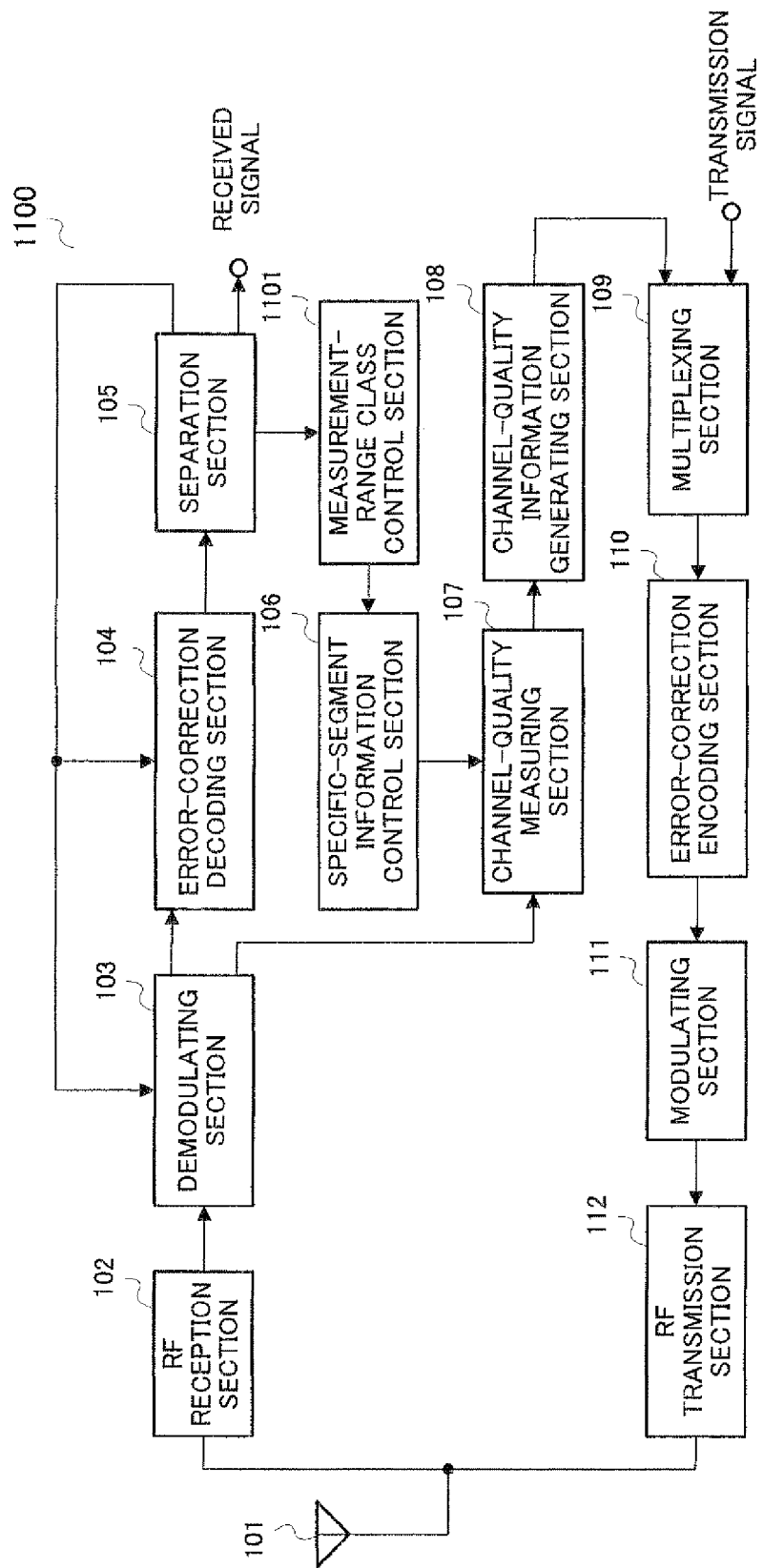
FIG. 11 is a block diagram showing the configuration of a communication apparatus according to Embodiment 4 of the present invention.

FIG. 11 is a block diagram showing the configuration of communication apparatus 1100 according to Embodiment 4 of the present invention. In the present Embodiment 4, the case will be described as an example where communication apparatus 1100 is applied to a communication terminal apparatus.

In communication apparatus 1100 according to the present Embodiment 4, measurement-range class control section 1101 as shown in FIG. 11 is added to communication apparatus 100 according to Embodiment 1 shown in FIG. 1. In FIG. 11, components that are the same as those in FIG. 1 will be assigned the same reference numerals without further explanations.

Separation section 105 separates radio-resource allocation information and transmission parameter information from the received signal inputted from error-correction decoding section 104 and outputs the separated radio-resource allocation information and transmission parameter information to demodulating section 103 and error-correction decoding section 104. Separation section 105 also separates measurement-range class information which is information indicating in stages the allowable delay time for the data transmitted to communication apparatus 1100, from the received signal inputted from error-correction decoding section 104 and outputs the separated measurement-range class information to measurement-range class control section 1101. Separation section 105 also outputs the received signal after separating the measurement-range class information, the radio-resource allocation information and the transmission parameter information. Measurement-range class information will be described in more detail later.

Measurement-range class control section 1101 stores the same information for selecting a measurement range as the base station apparatus, in which the measurement-range class and measurement range are associated, and selects a measurement range referring to the information for selecting a measurement range using measurement-range class information inputted from separation section 105. Measurement-range class control section 1101 then outputs information of the selected measurement range to specific-segment information control section 106.

Specific-segment information control section 106 selects subcarriers to which data transmitted to communication apparatus 1100 is allocated, for each measurement range, from information of the measurement range inputted from measurement-range class control section 1101, and outputs information of the selected subcarrier to channel quality measuring section 107. The method for selecting subcarriers will be described later.

Figure 12:
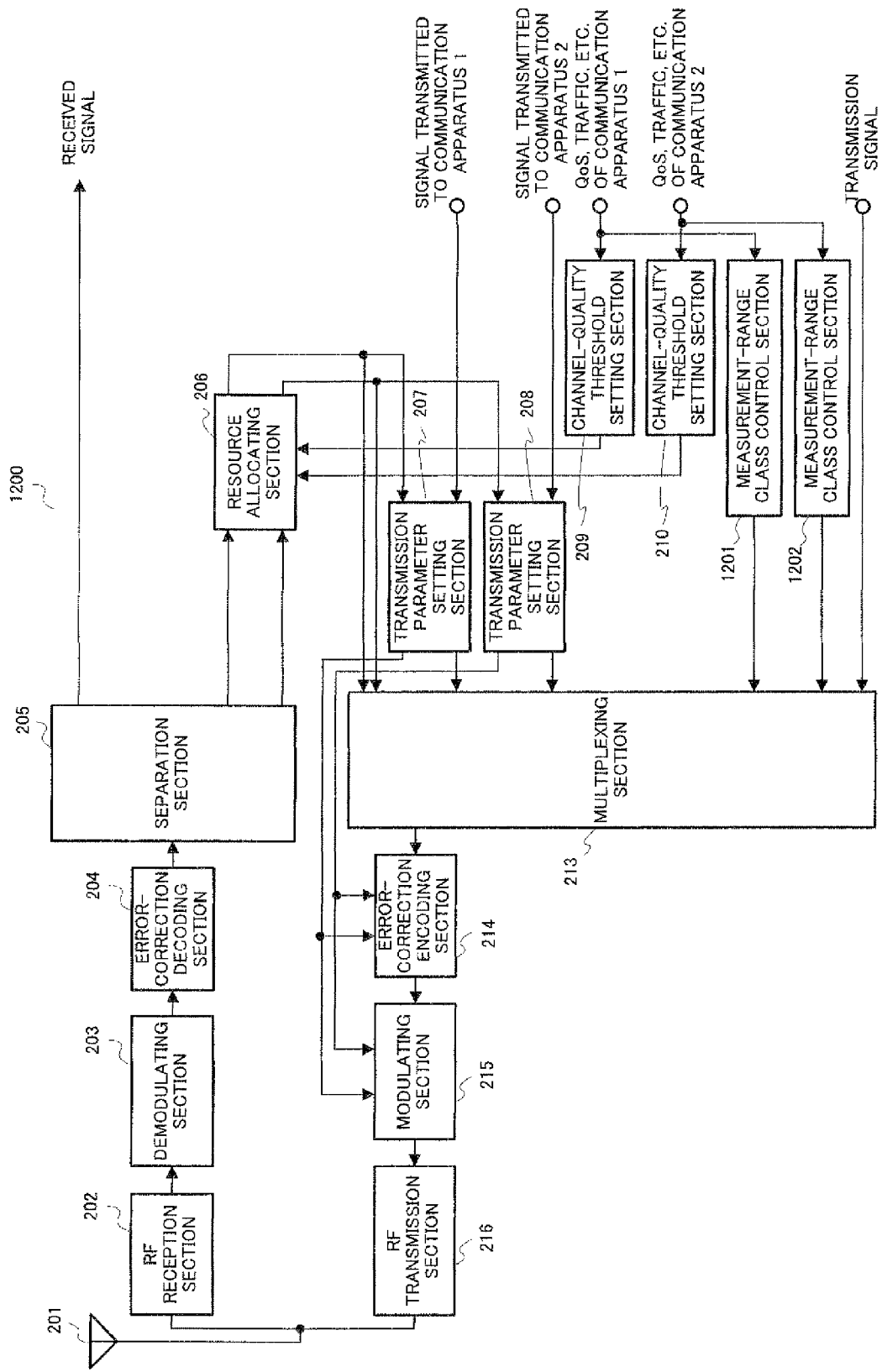
FIG. 12 is a block diagram showing the configuration of a base station apparatus according to Embodiment 4 of the present invention.

The configuration of base station apparatus 1200 will be described next using FIG. 12. FIG. 12 is a block diagram showing the configuration of base station apparatus 1200.

In base station apparatus 1200 according to the present Embodiment 4, specific-segment allocation setting sections 211 and 212 are removed from base station apparatus 200 according to Embodiment 1 shown in FIG. 2, and measurement-range class control sections 1201 and 1202 are added as shown in FIG. 12. In FIG. 12, components that are the same as those in FIG. 2 will be assigned the same reference numerals without further explanations. FIG. 12 shows the case where base station apparatus 1200 communicates with two communication apparatuses 1100, but base station apparatus 1200 can also communicate with an arbitrary number other than two, of communication apparatuses. In this case, transmission parameter setting sections 207 and 208, channel quality threshold setting sections 209 and 210, and measurement-range class control sections 1201 and 1202 may be provided with the same number as the communication apparatuses that are in communication.

Measurement-range class control section 1201 stores the same information for selecting a measurement range as measurement-range class control section 1101, selects a measurement range from the measurement ranges set in stages for each allowable delay, based on the value such as QoS and traffic of the communication apparatus, and outputs information of the selected measurement range to multiplexing section 213 as measurement-range class information.

Measurement-range class control section 1202 stores the same information for selecting a measurement range as measurement-range class control section 1101, selects a measurement range from the measurement ranges set in stages for each allowable delay based on the value such as QoS and traffic of the communication apparatus, and outputs information of the selected measurement range to multiplexing section 213 as measurement-range class information.

Figure 13:
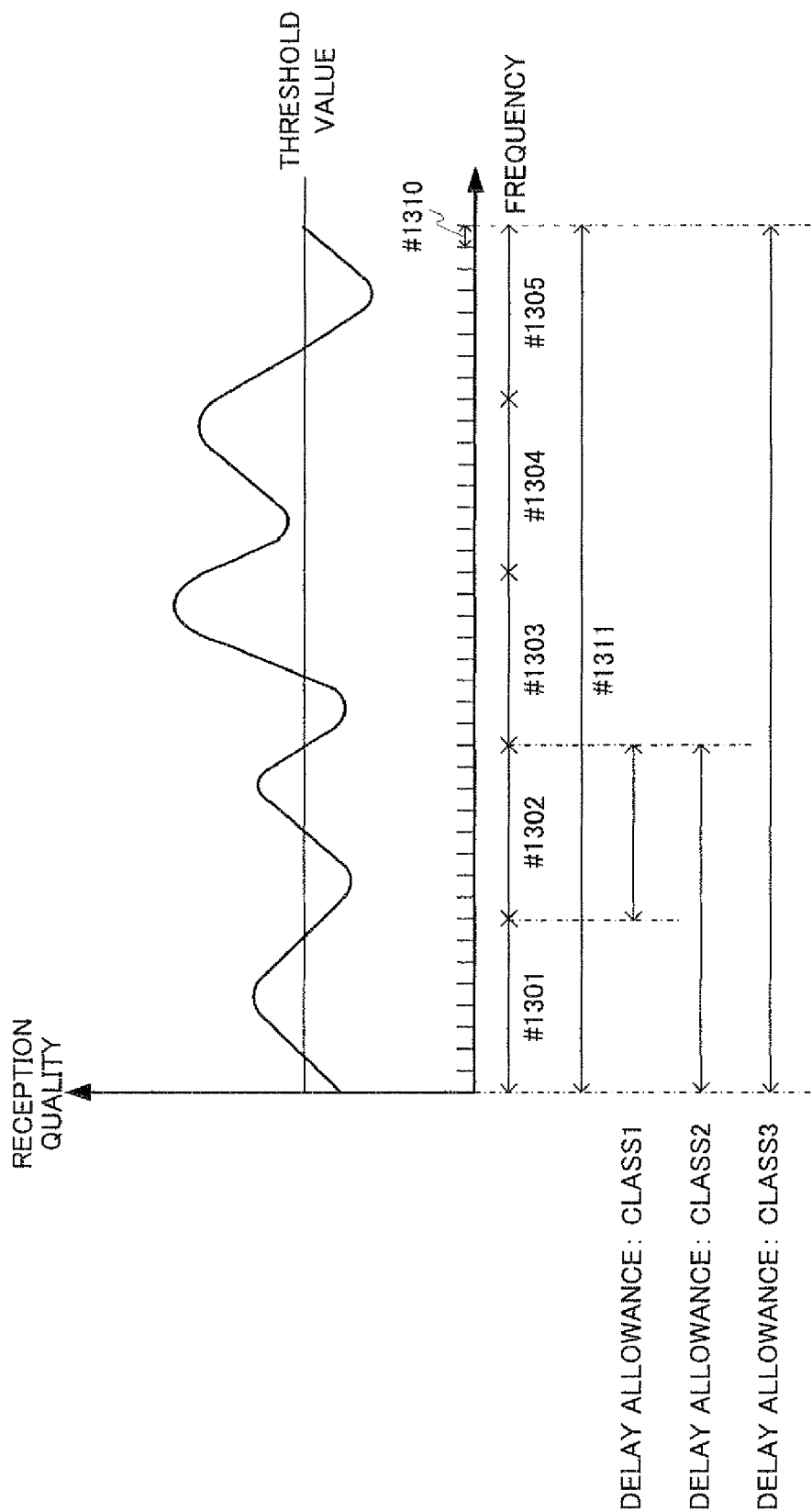
FIG. 13 shows the relationship between frequency and channel quality according to Embodiment 4 of the present invention.

The method for selecting subcarriers will be described next. FIG. 13 shows the relationship between frequency and channel quality within communication band #1311 of MS#1 and MS#2. Forty subcarriers #1310 are present within communication band #1311 in FIG. 13, and five specific segments #1301, #1302, #1303, #1304 and #1305 are set within communication band #1311. In the measurement-range class information, delay allowance class 1 selects specific segment #1302, delay allowance class 2 selects specific segments #1301 and #1302, and delay allowance class 3 selects specific segments #1301, #1302, #1303 and #1304, that is, all the subcarriers within communication band #1311. Delay allowance class 1 includes the largest allowable delay time, delay allowance class 3 includes the smallest allowable delay time, and delay allowance class 2 includes a smaller allowable delay time than delay allowance class 1 and a larger allowable delay time than delay allowable class 3. Subcarriers to which data is allocated are thus reduced in accordance with an increase in the allowable delay time of the data.

According to FIG. 13, base station apparatus 1200 transmits, for example, the measurement-range class information of delay allowance class 1 to communication apparatus 1100 that transmits data having a large allowable delay time, and transmits the measurement-range class information of delay allowance class 3 to communication apparatus 1100 that transmits data having a small allowable delay time. Other than the fact that measurement ranges are allocated instead of specific segments and measurement-range class information is transmitted instead of specific segment information, the operation of communication apparatus 1100 and base station apparatus 1200 is the same as in FIG. 3, and therefore a description of that operation will be omitted.

According to the present Embodiment 4, subcarriers are divided into groups for each measurement range, and measurement ranges are selected according to the allowable delay time, so that, in addition to the effects of the above-described Embodiment 1, subcarrier frequency scheduling can be accurately performed in accordance with the allowable delay time. According to the present Embodiment 4, the communication apparatus can select subcarriers by transmitting measurement-range class information from the base station, so that it is possible to simplify the processing for selecting subcarriers.

Embodiment 5

Figure 14:
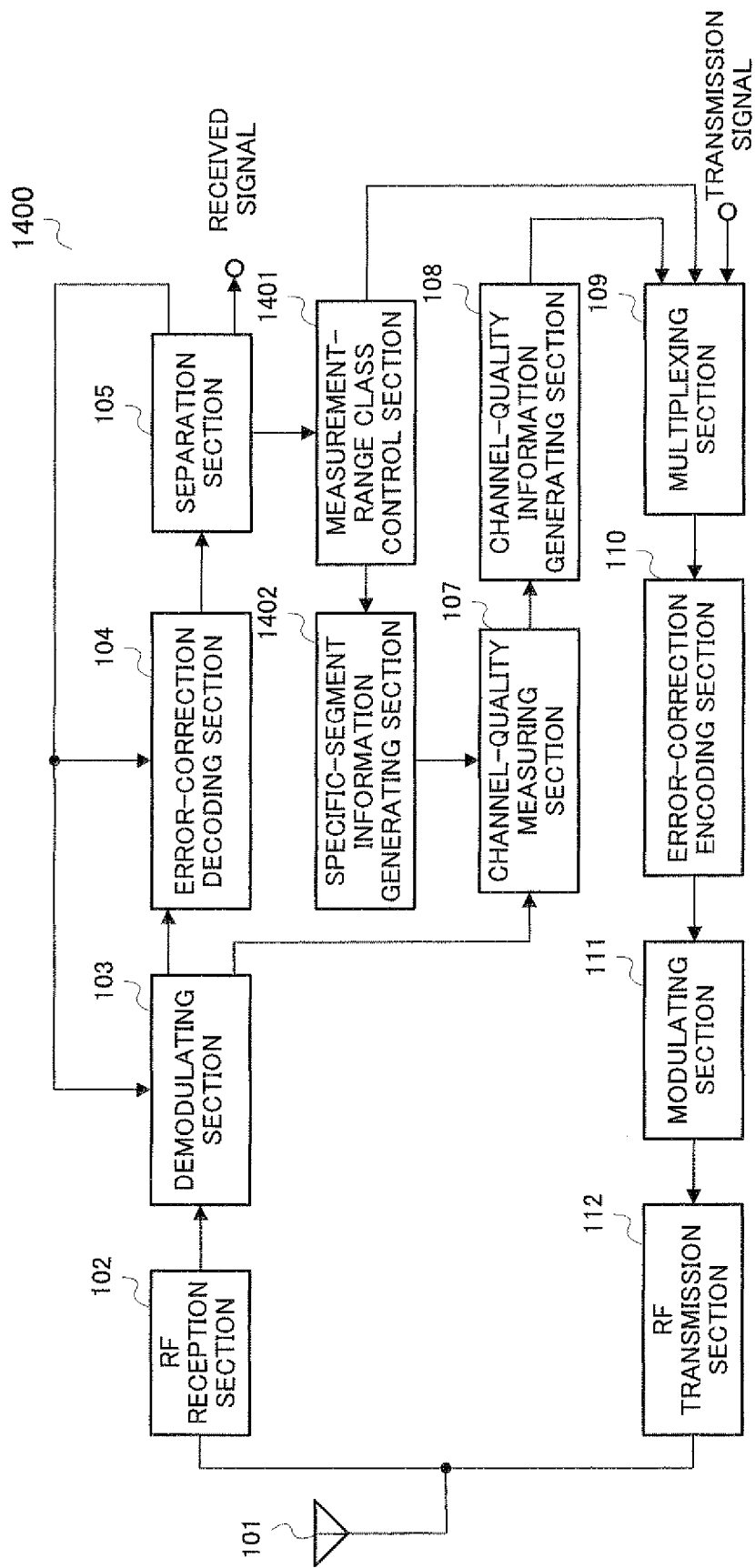
FIG. 14 is a block diagram showing the configuration of a communication apparatus according to Embodiment 5 of the present invention.

FIG. 14 is a block diagram showing the configuration of communication apparatus 1400 according to Embodiment 5 of the present invention. In the present Embodiment 5, the case will be described as an example where communication apparatus 1400 is applied to a communication terminal apparatus.

In communication apparatus 1400 according to the present Embodiment 5, specific-segment information control section 106 is removed from communication apparatus 100 according to Embodiment 1 shown in FIG. 1, and measurement-range class control section 1401 and specific-segment information generating section 1402 are added as shown in FIG. 14. In FIG. 14, components that are the same as those in FIG. 1 will be assigned the same reference numerals without further explanations.

Separation section 105 separates radio-resource allocation information and transmission parameter information from the received signal inputted from error-correction decoding section 104 and outputs the separated radio-resource allocation information and transmission parameter information to demodulating section 103 and error-correction decoding section 104. Separation section 105 also separates QoS information, which is information indicating the allowable delay time of the data transmitted to communication apparatus 1400, from the received signal inputted from error-correction decoding section 104 and outputs the separated QoS information to measurement-range class control section 1401. Separation section 105 also outputs the received signal after separating the QoS information, the radio-resource allocation information and the transmission parameter information.

Measurement-range class control section 1401 stores the same information for selecting a measurement range as the base station apparatus, in which measurement-range class and measurement range for each allowable delay time are associated, and selects a measurement range according to the allowable delay time referring to the information for selecting a measurement range using the Qos information inputted from separation section 105. Measurement-range class control section 1401 then outputs information of the selected measurement range to specific-segment information generating section 1402 and multiplexing section 109.

Specific-segment information control section 1402 selects the subcarriers of the measurement ranges as subcarriers to which data transmitted to communication apparatus 1400 is allocated, according to the information of measurement ranges inputted from measurement-range class control section 1401 and outputs information of the selected subcarriers to channel quality measuring section 107.

Channel quality measuring section 107 measures channel quality for the selected subcarriers from the information of the subcarriers inputted from specific-segment information generating section 1402 using a pilot signal which is a known signal included in the received signal inputted from demodulating section 103. Channel quality measuring section 107 then outputs the measurement result to channel quality information generating section 108.

Multiplexing section 109 multiplexes the received signal, the channel quality information inputted from channel quality information generating section 108, and the measurement-range class information inputted from measurement-range class control section 1401, and outputs the result to error-correction encoding section 110.

Figure 15:
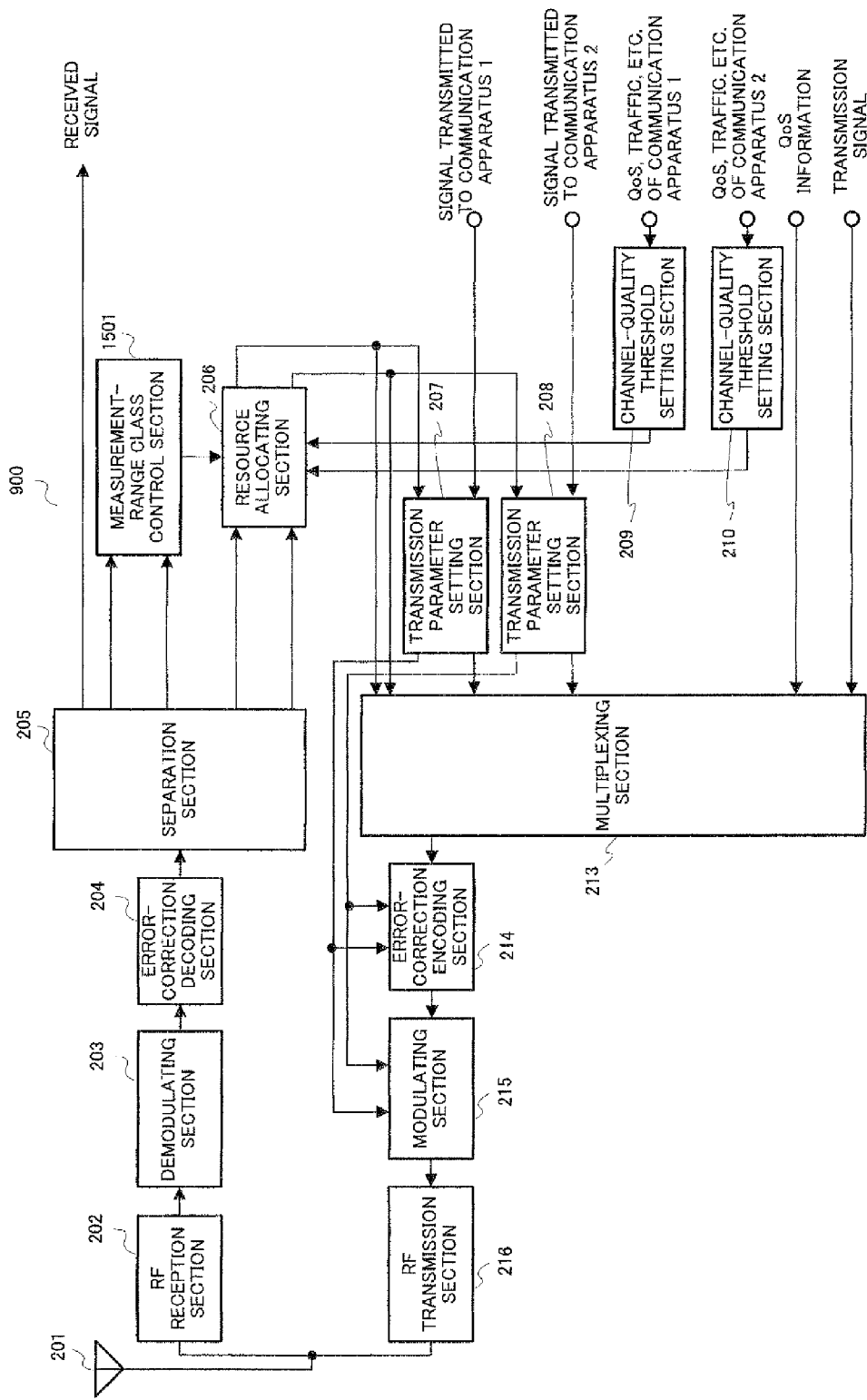
FIG. 15 is a block diagram showing the configuration of a base station apparatus according to Embodiment 5 of the present invention.

The configuration of base station apparatus 1500 will be described next using FIG. 15. FIG. 15 is a block diagram showing the configuration of base station apparatus 1500. In base station apparatus 1500 according to the present Embodiment 5, specific-segment allocation setting sections 211 and 212 are removed from base station apparatus 200 according to Embodiment 1 shown in FIG. 2, and measurement-range class control section 1501 is added as shown in FIG. 15. In FIG. 15, components that are the same as those in FIG. 2 will be assigned the same reference numerals without further explanations Separation section 205 separates channel quality information and measurement-range class information for each subcarrier reported from each communication apparatus, from the received signal inputted from error-correction decoding section 204. Separation section 205 outputs the separated channel quality information of each communication apparatus to resource allocating section 206 and outputs the separated measurement-range class information of each communication apparatus to measurement-range class control section 1501. Separation section 205 also outputs the received signal after separating the channel quality information and the measurement-range class information.

Measurement-range class control section 1501 stores the same information for selecting a measurement range as measurement-range class control section 1401 and selects a measurement range referring to the information for selecting a measurement range using the measurement-range class information inputted from separation section 205. Measurement-range class control section 1501 instructs resource allocating section 206 to allocate resources within the selected measurement range, that is, within the measurement range selected by communication apparatus 1400.

Resource allocating section 206 allocates resources—subcarriers—to each communication apparatus based on the channel quality information inputted from separation section 205 and information of the threshold value inputted from channel quality threshold setting sections 209 and 210, for the subcarriers indicated by measurement-range class control section 1501. Resource allocating section 206 then outputs radio-resource allocation information, which is information of the allocated subcarriers, to multiplexing section 213 and also outputs the radio-resource allocation information for each communication apparatus to transmission parameter setting sections 207 and 208.

Multiplexing section 213 multiplexes the transmission parameter information inputted from transmission parameter setting sections 207 and 208, the radio-resource allocation information inputted from resource allocating section 206, the QoS information, and the transmission signal, and outputs the result to error-correction encoding section 214. Other than the fact that measurement ranges are allocated instead of specific segments and measurement-range class information is transmitted instead of specific segment information, the operation of communication apparatus 1400 and base station apparatus 1500 is the same as in FIG. 10, and therefore a description of that operation will be omitted. The method for selecting subcarriers is the same as in FIG. 13, and therefore a description of that method will be omitted.

According to the present Embodiment 5, the communication terminal apparatus selects a measurement range in accordance with the allowable delay time of the transmission data, measures channel quality for only the subcarriers within the selected measurement range, and reports the quality to the base station apparatus, so that it is possible to reduce the amount of control information, minimize interference with other traffic, and prevents increases in current consumption.

According to the present Embodiment 5, subcarriers are also divided into groups for each measurement range, and the measurement range is selected according to the delay allowance class, so that subcarrier frequency scheduling can be accurately performed in accordance with the allowable delay time. According to the present Embodiment 5, subcarriers can be selected only by transmitting measurement-range class information, so that it is possible to simplify the processing for selecting subcarriers.

The present application is based on Japanese Patent Application No. 2004-319801, filed on Nov. 2, 2004, the entire content of which is expressly incorporated by reference herein.

INDUSTRIAL APPLICABILITY

The communication apparatus and the scheduling method according to the present invention are suitable for applying to a communication scheme using frequency scheduling.

The invention claimed is:

1. A transmitting apparatus comprising:
    a measuring unit configured to measure channel qualities for subcarriers included in a transmitting band; and
    a transmitting unit configured to transmit first information indicating channel qualities of all of the subcarriers included in the transmitting band within a first transmitting interval and second information indicating channel qualities of one or more parts of the subcarriers included in the transmitting band within a second transmitting interval;
    wherein the transmitting unit alternately transmits the first information within the first transmitting interval and the second information within the second transmitting interval;
    wherein the transmitting unit repeats transmitting of the first information within the first transmitting interval and the second information within the second transmitting interval.

2. The transmitting apparatus according to claim 1, further comprising a receiver configured to receive third information indicating the first transmitting interval or the second transmitting interval,
    wherein the transmitting unit transmits the first information or the second information based on the third information.

3. A transmitting method performed by a transmitting apparatus implementing operations comprising:
    measuring channel qualities for subcarriers included in a transmitting band; and
    transmitting first information indicating channel qualities of all of the subcarriers included in the transmitting band within a first transmitting interval and second information indicating channel qualities of one or more parts of the subcarriers included in the transmitting band within a second transmitting interval,
    wherein the first information and the second information are transmitted alternately and repeatedly.

* * * * *